US012775266B2

(12) United States Patent
Takedo et al.

(10) Patent No.: US 12,775,266 B2
(45) Date of Patent: Oct. 27, 2026

(54) INJECTION MOLDING MACHINE AND METHOD OF PROVIDING COMPONENT REPLACEMENT RECOMMENDATION INFORMATION FOR INJECTION MOLDING MACHINE

(71) Applicant: THE JAPAN STEEL WORKS, LTD., Tokyo (JP)

(72) Inventors: Hirotaka Takedo, Tokyo (JP); Megumi Otani, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 337 days.

(21) Appl. No.: 18/444,300

(22) Filed: Feb. 16, 2024

(65) Prior Publication Data

US 2024/0280966 A1 Aug. 22, 2024

(30) Foreign Application Priority Data

Feb. 22, 2023 (JP) ................................ 2023-026649

(51) Int. Cl.
*G05B 19/4155* (2006.01)

(52) U.S. Cl.
CPC .................... *G05B 19/4155* (2013.01); *G05B 2219/45244* (2013.01)

(58) Field of Classification Search
None
See application file for complete search history.

(56) References Cited

U.S. PATENT DOCUMENTS

2004/0148136 A1* 7/2004 Sasaki ................ G05B 19/4065
702/184

FOREIGN PATENT DOCUMENTS

| | | | | |
|---|---|---|---|---|
| JP | 2005-258585 | A | | 9/2005 |
| JP | 4276464 | B2 | | 6/2009 |
| JP | 2010132051 | A | * | 6/2010 |
| JP | 2020-086495 | A | | 6/2020 |
| JP | 2023-020062 | A | | 2/2023 |

OTHER PUBLICATIONS

English Translation of JP-2010132051-A (Year: 2010).*
Japanese Office Action issued on Sep. 1, 2026 from thr Japanese Patent Office for Japanese Patent Application No. 2023-026649.

* cited by examiner

*Primary Examiner* — Ryan A Jarrett
(74) *Attorney, Agent, or Firm* — Sughrue Mion, PLLC

(57) ABSTRACT

An injection molding machine includes a control device configured to estimate a service life for a plurality of managed components among components of an injection molding machine. The control device is configured to manage, for each of the managed components, a usage start date, an estimated service life date, and an estimated lead time. In a case where one or a plurality of the managed components reaches an advance notice date, the control device is configured to: take the managed component as a recommended replacement component; and provide component replacement recommendation information including information to prompt replacement and the estimated lead time for the recommended replacement component.

19 Claims, 8 Drawing Sheets

INJECTION MOLDING MACHINE AND METHOD OF PROVIDING COMPONENT REPLACEMENT RECOMMENDATION INFORMATION FOR INJECTION MOLDING MACHINE

CROSS-REFERENCE TO RELATED APPLICATIONS

This application is based on and claims priority under 35 USC 119 from Japanese Patent Application No. 2023-026649 filed on Feb. 22, 2023, the entire content of which is incorporated herein by reference.

TECHNICAL FIELD

The present invention relates to an injection molding machine and a method of providing component replacement recommendation information for an injection molding machine that estimate a service life of a component and provide information on replacement of a component.

BACKGROUND

An injection molding machine includes a plurality of components, including a component that may deteriorate and fail after long-term operation. Examples of the component include a ball screw, a servo amplifier, a cooling fan, a relay, and the like. If the component fail, the injection molding machine cannot be operated until the component is replaced. When it is determined that a component is nearing the end of a service life thereof, a manager of the injection molding machine can order the component at an early stage so as to reduce a downtime in which the injection molding machine cannot operate. However, if a failure occurs due to overlooking of the deterioration, the injection molding machine cannot be operated until the component is received and replaced. In particular, when a component which takes a long time from ordering to receiving fails, long-term suspension of operation is unavoidable.

JP4276464B proposes an injection molding machine that calculates an accumulated usage time of each component constituting the injection molding machine and estimates and displays a service life. The injection molding machine also provides information on prices of the components.

SUMMARY

The related-art injection molding machine disclosed in JP4276464B estimates the service life of the components and provides information, allowing a manager to order a component at an early stage. However, there is also a problem to be solved. Specifically, a time required to procure the component is not taken into account. Some components are easily available, such as a so-called general-purpose component, but for example, in the case of a component that is made to order or in the case of ordering from overseas, a long time is required from the order to acquisition. In the injection molding machine disclosed in JP4276464B, even if the service life is estimated and the manager is prompted to place an order before a component fails, if it takes time to acquire the component, there is a possibility that the component fails before the component is acquired and the injection molding machine is stopped for a long period of time.

Illustrative aspects of the present disclosure provide an injection molding machine that enables acquiring of a component nearing the end of a service life at an appropriate time and shortening a downtime.

Other problems and novel features will become apparent from description of the present description and the accompanying drawings.

An injection molding machine includes: a control device configured to estimate a service life for a plurality of managed components among components of an injection molding machine, with the plurality of managed components being management targets. The control device is configured to manage, for each of the managed components, a usage start date on which usage is started, an estimated service life date which is estimated to be a day on which the service life is reached, and an estimated lead time which is an estimation of a lead time required from order placement to completion of replacement. In a case where one or a plurality of the managed components reaches an advance notice date which is ahead of the estimated service life date by a predetermined number of days, the control device is configured to: take the managed component as a recommended replacement component; and provide component replacement recommendation information including information to prompt replacement and the estimated lead time for the recommended replacement component.

According to the present disclosure, information on estimated lead time can be utilized, so that a component that is nearing the end of service life can be grasped at an appropriate time, and downtime can be shortened.

DETAILED DESCRIPTION

Figure 1:
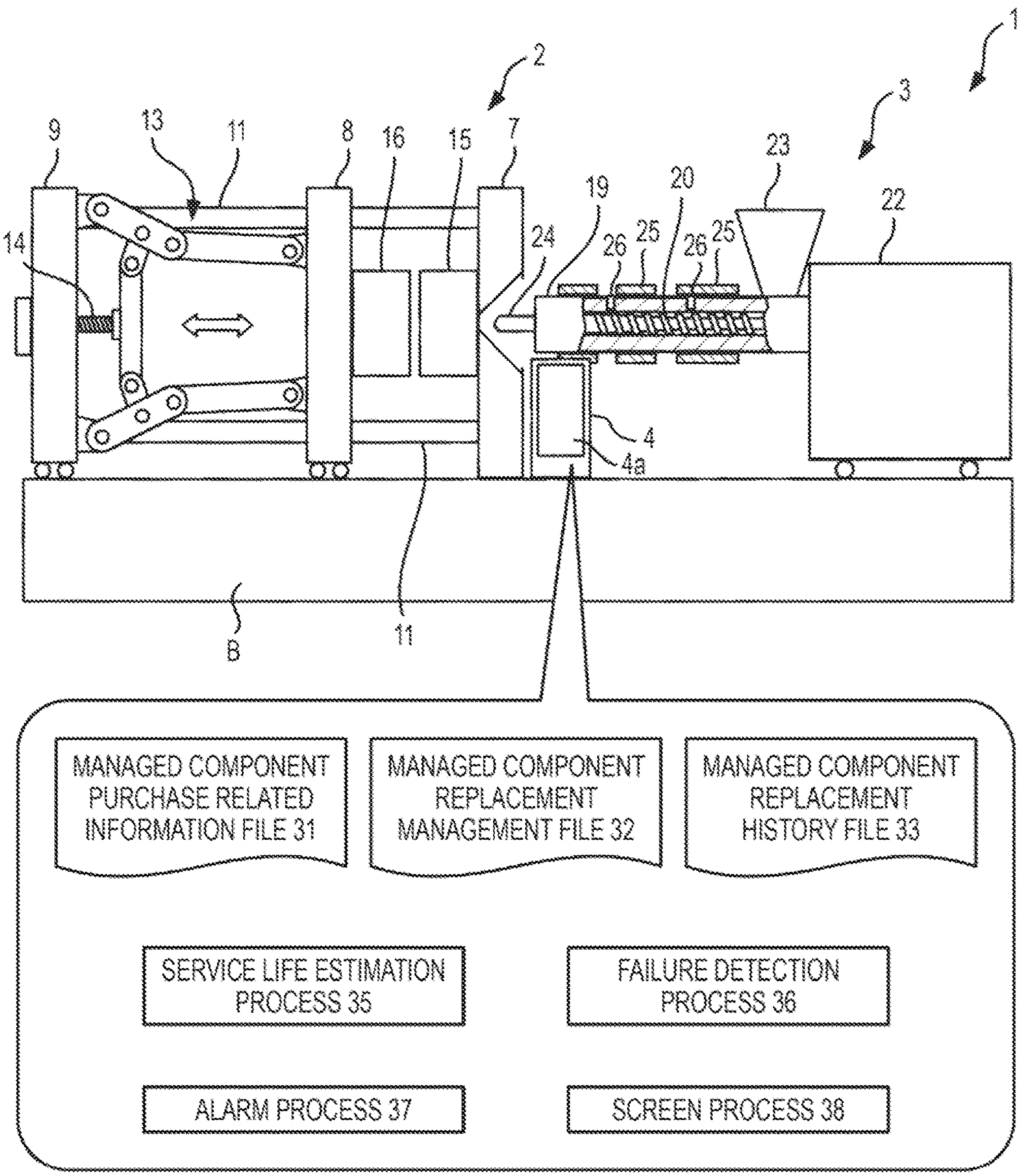
FIG. 1 is a front view of an injection molding machine according to the present illustrative embodiment.

Hereinafter, a specific illustrative embodiment will be described in detail with reference to the drawings. However, the present invention is not limited to the following illustrative embodiment. In order to clarify the description, the following description and the drawings are simplified as appropriate. In the drawings, the same elements are denoted by the same reference numerals, and repeated description thereof is omitted as necessary. In addition, hatching may be omitted to avoid complicating the drawings.

Illustrative Embodiment

{Injection Molding Machine}

As shown in FIG. 1, an injection molding machine 1 according to the present illustrative embodiment includes a mold clamping device 2 and an injection device 3. The injection molding machine 1 includes a controller, that is, a control device 4. The mold clamping device 2, the injection device 3, and the like are controlled by the control device 4. The control device 4 has a monitor 4*a* on which various screens are displayed.

{Mold Clamping Device}

The mold clamping device 2 includes a fixed platen 7, a movable platen 8, and a mold clamping housing 9. The fixed platen 7 is fixed to a bed B. The movable platen 8 is slidably provided on the bed B. The fixed platen 7 and the mold clamping housing 9 are coupled to each other by a plurality of tie bars 11, 11 . . . , and the movable platen 8 is slidable between the fixed platen 7 and the mold clamping housing 9. A mold clamping mechanism, that is, a toggle mechanism 13 in the present illustrative embodiment is provided between the mold clamping housing 9 and the movable platen 8. The toggle mechanism 13 is driven by a driving part including a ball screw 14. The fixed platen 7 and the movable platen 8 are provided with a fixed side mold 15 and a movable side mold 16, respectively. Therefore, the molds 15 and 16 are opened and closed when the toggle mechanism 13 is driven.

{Injection Device}

The injection device 3 includes a heating cylinder 19, a screw 20 provided in the heating cylinder 19, and a screw driving device 22. The heating cylinder 19 is supported by the screw driving device 22. The screw 20 is driven by the screw driving device 22 in a rotational direction and an axial direction. The heating cylinder 19 is provided with a hopper 23 and an injection nozzle 24. In such an injection device 3, the heating cylinder 19 is provided with heaters 25, 25, . . . , and temperature sensors 26, 26, . . . , which are thermocouples, are embedded therein.

In the injection device 3, the heating cylinder 19 is heated by the heaters 25, 25, . . . an injection material is supplied from the hopper 23, and the screw 20 is rotated. As a result, the injection material is melted and sent to a distal end of the heating cylinder 19, and the screw 20 is retracted. That is, metering is performed. The temperature of the injection material is monitored by the temperature sensors 26, 26, . . . , and the metering is continued while controlling the outputs of the heaters 25, 25, . . . . When the metering is completed, the screw 20 is driven in the axial direction. As a result, the injection material is injected.

{Managed Component}

The injection molding machine 1 includes a plurality of components as described above, and some components deteriorate due to long-term operation and need to be replaced. The injection molding machine 1 according to the present illustrative embodiment estimates a service life of a predetermined component as a management target, and recommends replacement when the component reaches the end of the service life or nears the end of the service life. Such a component as the management target is referred to as a managed component in this description. In the present illustrative embodiment, the following types of managed components are targeted. That is, ball screws, a circuit board, the servo amplifier, the cooling fan, the thermocouples, and the relay.

The ball screws include not only the mold clamping ball screw 14 provided in the mold clamping device 2, but also those provided in the screw driving device 22, although not described, and other ball screws. Although not shown, the circuit board, the servo amplifier, and the relay are all accommodated in the bed B. The circuit board includes electronic circuits that control various devices. The servo amplifier supplies a three-phase AC voltage to servo motors that drive various devices. The relay connects a control circuit and various devices. The cooling fan is provided not only in the bed B but also in various devices to cool the devices. Any type of component may be taken as the managed component, and the component is not necessarily limited to the component adopted in the present illustrative embodiment.

{Service Life Management Function}

In the injection molding machine 1 according to the present illustrative embodiment, a service life management function that estimates a service life of a managed component and recommends replacement of the component is provided in the control device 4. FIG. 1 shows a file group and a process group for achieving the service life management function. The file group includes a managed component purchase related information file 31, a managed component replacement management file 32, and a managed component replacement history file 33. The process group includes a service life estimation process 35, a failure detection process 36, an alarm process 37, and a screen process 38. The file group and the process group are merely conceptualized and summarized for convenience to facilitate explanation, and the configuration thereof is not necessarily limited thereto. The file group and the process group will be briefly described.

{Managed Component Purchase Related Information File}

The managed component purchase related information file 31 includes information to be referred to when newly purchasing a managed component. The following information is stored for each managed component.

Component Price

Purchase price of a managed component. Not only Japanese yen but also currencies of other countries such as US dollars may be used.

Estimated Lead Time

Estimated period of the lead time required from order placement to completion of replacement.

Number of Advance Notice Days

Number of days for calculating an advance notice date which is ahead of an estimated service life date for a managed component. The advance notice date is a date on which a user is recommended to replace the managed component and is provided with the information. If zero is set, the advance notice date is the estimated service life date. The number of advance notice days may not be set for each managed component and may be set as a number of days common to all managed components.

Component Reference Information

Information that can be used as a reference in the determination of component purchase, such as used product prices.

{Managed Component Replacement Management File}

The managed component replacement management file 32 includes information on managed components currently in use. The following information is stored for each managed component.

Usage Start Date

Date on which the managed component is started to be used. Replacement date if the managed component is replaced.

Usable Period

Period predetermined for each managed component, and is a period during which the managed component can be used when operated under normal load and frequency of use.

Presence or Absence of Failure

Only applies to a managed component whose failure can be detected by the control device 4. Information on whether or not the managed component fails.

{Managed Component Replacement History File}

The managed component replacement history file 33 includes a history of replacement of the managed components. The following information is stored.

Managed Component Information

Name and component number of the replaced managed component.

Replacement Date

Date on which the managed component is replaced.

Component Price

Purchase price of the managed component at the time of replacement. Not only Japanese yen but also currencies of other countries such as US dollars may be used.

{Service Life Estimation Process}

The service life estimation process 35 is executed periodically, for example, every day. Further, the screen process 38 is also executed. When executed, the service life estimation process 35 estimates a service life for each managed component and calculates the estimated service life date. Specifically, for each managed component, the "usable period" is added to the "usage start date" stored in the managed component replacement management file 32 to calculate the estimated service life date. It is determined whether a current date and time has reached a date ahead of the calculated estimated service life date by the "number of advance notice days", that is, whether the current date and time has reached the advance notice date.

The service life estimation process 35 can also modify the calculation method of the estimated service life date. This is because depending on the type of the managed component, the service life may be reached earlier due to the accumulation of loads during use. For example, in the case of a ball screw, it can be considered that the service life has been reached when a rotation number, which is the load, reaches a prescribed rotation number, that is, the service life rotation number. By obtaining the rotation number of the ball screw per molding cycle in advance and multiplying the rotation number by the number of molding cycles performed since the "usage start date", a total rotation number, which is the cumulative load, can be obtained. By calculating a ratio of the total rotation number to the service life rotation number, it is possible to evaluate a degree of deterioration of the ball screw until the service life is reached, and it is possible to estimate the day when the service life is reached based on a period from the usage start date to the present. Therefore, the service life estimation process 35 can bring forward the estimated service life date if the date estimated to be the day when the service life is reached as described above is earlier than the estimated service life date calculated based on the "usable period".

Even in the case of other managed components, by treating a computable index as a load as the rotation number in the case of the ball screw, it is possible to calculate a date when the service life is reached based on the cumulative load. When the service life estimation process 35 calculates a degree of reaching the service life based on such a cumulative load, information on the cumulative load regarding the managed components may be stored in the managed component replacement management file 32, and may be updated by the service life estimation process 35. When the calculation method of the estimated service life date is modified in this way, the service life estimation process 35 also determines whether the advance notice date, which is ahead of the calculated estimated service life date by the "number of advance notice days", has been reached.

{Failure Detection Process}

Some managed components can detect failures. For example, the servo amplifier, the relay, and the like. A failure can be detected when a voltage to be output is not detected. When the failure detection process 36 detects a failure in a managed component that can detect such a failure, "Yes" indicating a failure state is written in "Failure" of the managed component replacement management file 32, and the alarm process 37 is notified.

{Alarm Process}

When the service life estimation process 35 determines that there is a managed component that has reached the advance notice date, when the estimated service life date is reached for the managed component, or when the failure detection process 36 detects a failure, an alarm that recommends replacement of the managed component is output. The alarm to be output is outputted as a screen displayed on the monitor 4*a*, that is, as alarm screens 87A, 87B, 87C (FIG. 7A, FIG. 7B, FIG. 7C) described later.

{Screen Process}

Hereinafter, various screens achieving the service life management function in the injection molding machine 1 according to the present illustrative embodiment will be described.

{Component Service Life Estimation Screen}

Figure 2:
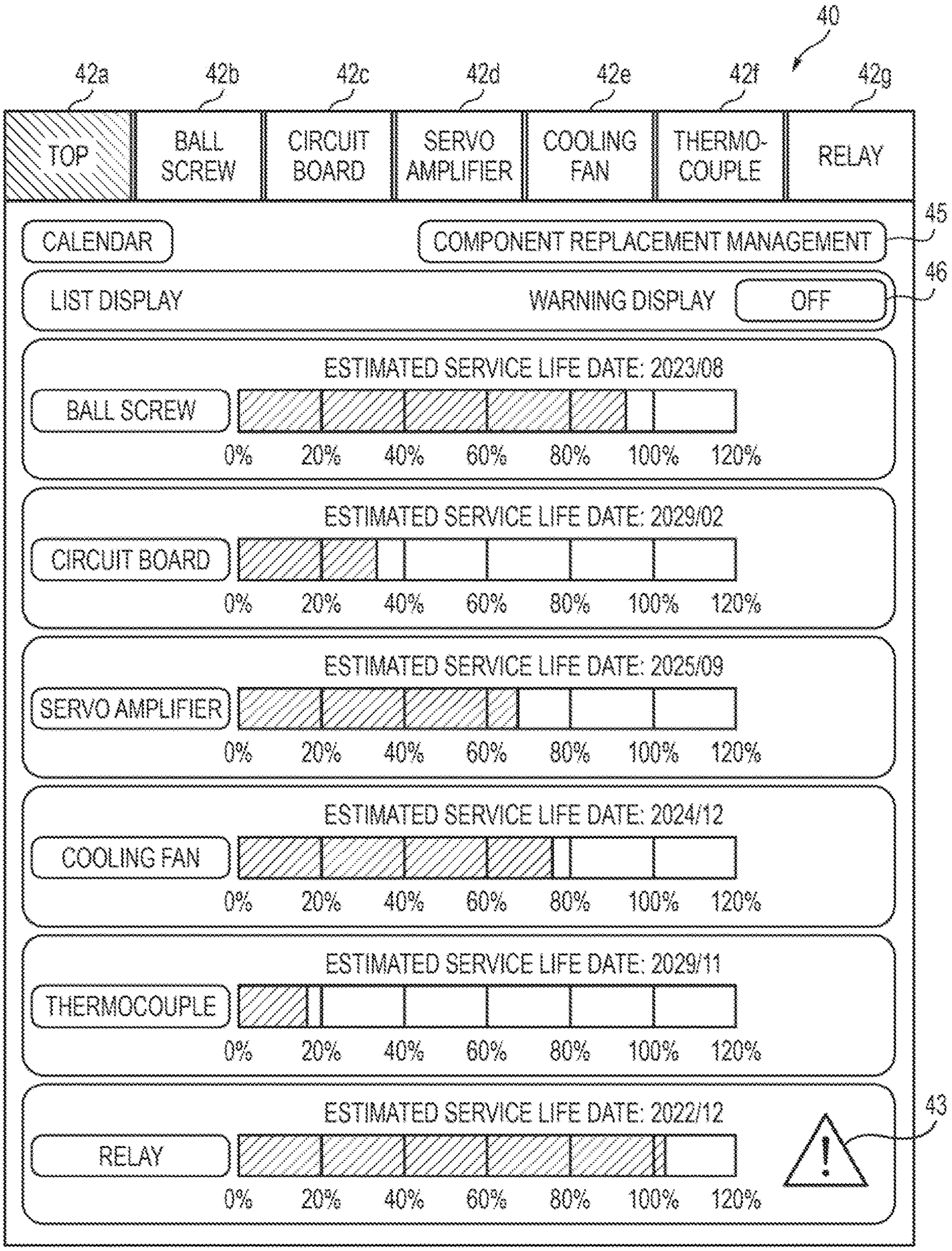
FIG. 2 is a component service life estimation screen according to the present illustrative embodiment.

The component service life estimation screen 40 is shown in FIG. 2. The component service life estimation screen 40 is displayed when a predetermined operation is performed on the monitor 4*a* of the control device 4. The component service life estimation screen 40 is for executing the service life estimation process 35 (see FIG. 1), and displays information on the service lives calculated by the service life estimation process 35. A plurality of display switching buttons 42*a*, 42*b*, . . . are provided at an upper part of the component service life estimation screen 40. When the display switching button 42*a* of "TOP" at the head on a left side is selected, information on the service lives of all types of managed components is displayed as shown in FIG. 2. That is, a ball screw, a circuit board, a servo amplifier, a cooling fan, a thermocouple, and a relay. The injection molding machine 1 (see FIG. 1) is provided with a plurality of each type of managed components, for example, ball screws, and among them, the one ball screw that is closest to the end of the service life thereof is displayed as a representative.

The estimated service life date is displayed for each type of managed component, and a service life reaching status from the "usage start date" to the estimated service life date is shown in a percentage graph. For example, for the ball screw, the estimated service life date is displayed as 2023/08, and the service life reaching status until the estimated service life date is 95%. In this graph, 0% corresponds to the "usage start date" and 100% corresponds to the estimated service life date. In this example, the estimated service life date is displayed in months. Alternatively, the estimated service life date may be displayed in days.

A warning mark 43 is displayed for the managed component relay. This indicates that it is necessary to consider replacement at an early stage for at least one relay among the plurality of relays provided. In this example, the relay has reached the estimated service life date and has exceeded 100%, satisfying a conditions for displaying the warning mark 43. The warning mark 43 is also displayed when there is a managed component whose "Failure" is "Yes" in the managed component replacement management file 32 (see FIG. 1).

Figure 4:
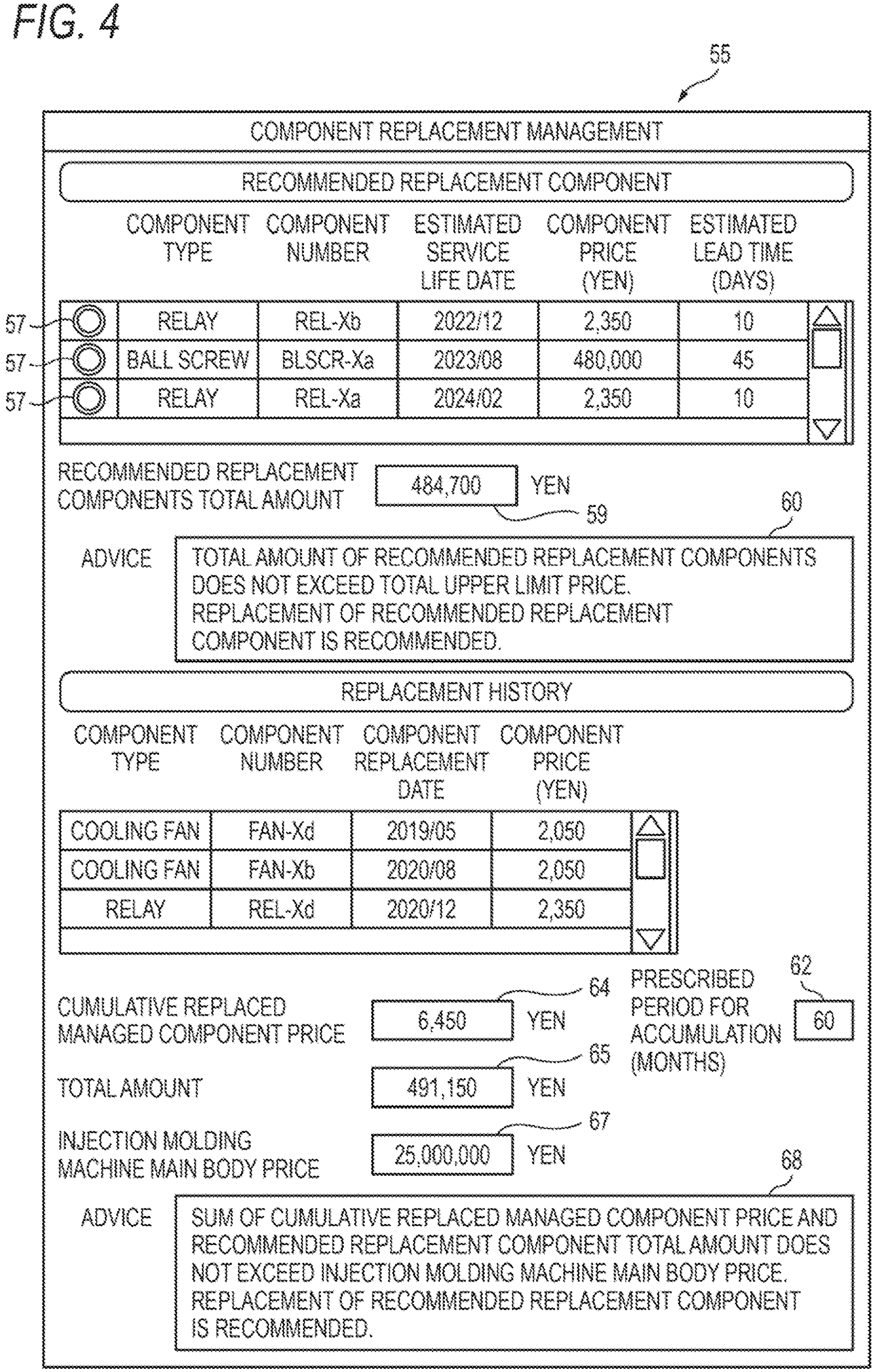
FIG. 4 is a component replacement management screen according to the present illustrative embodiment.

The component service life estimation screen 40 is provided with a component replacement management button 45 and a warning display ON/OFF button 46. When the component replacement management button 45 is selected, a component replacement management screen 55, which will be described in detail later with reference to FIG. 4, is displayed. When the warning display ON/OFF button 46 is selected, ON and OFF are switched. When switched to ON, the alarm process 37 becomes executable. On the other hand, when switched to OFF, the alarm process 37 (see FIG. 1) is not executed, and the display of the alarm screens 87A, 87B, and 87C (see FIGS. 7A, 7B, and 7C) is suppressed.

Figure 3:
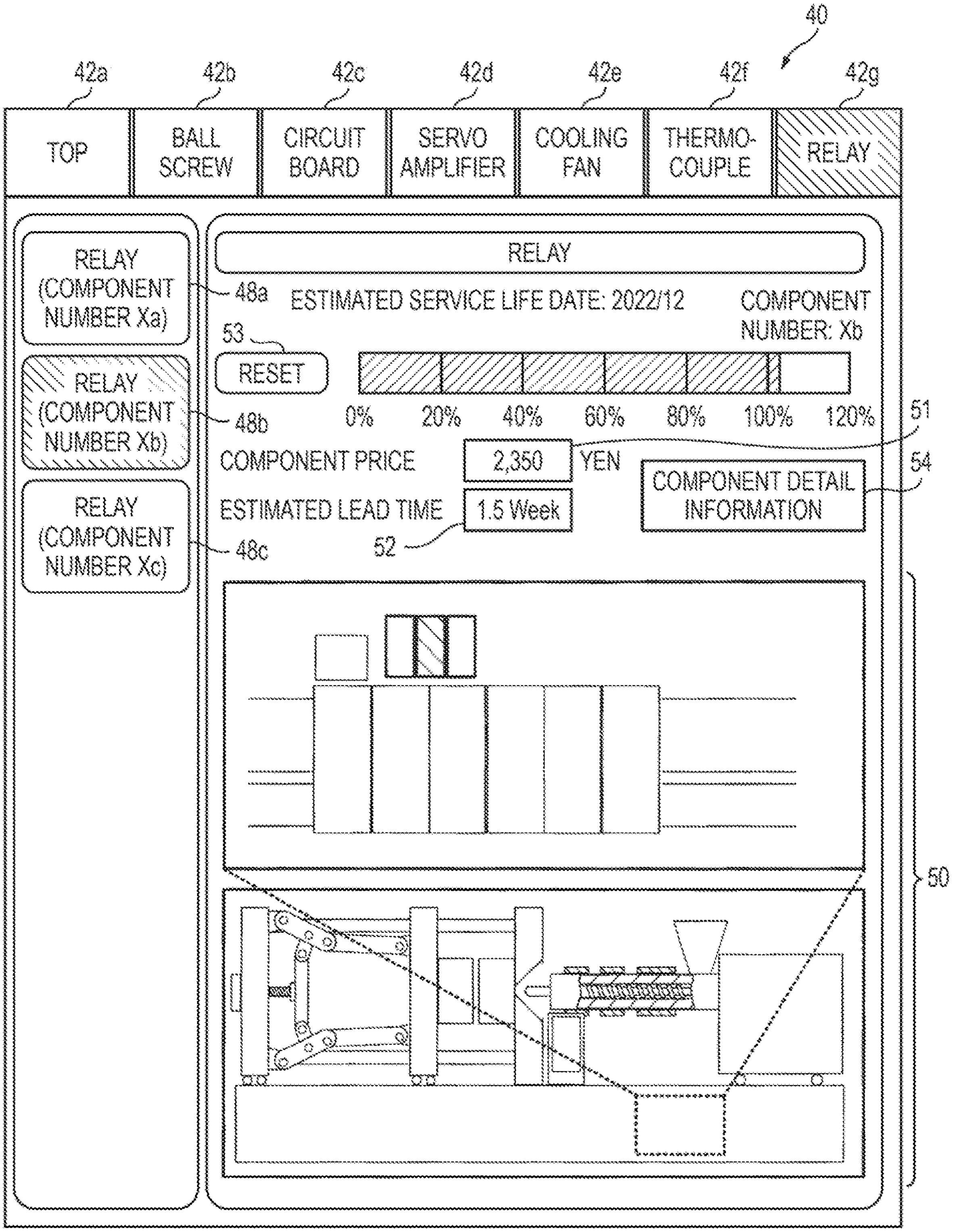
FIG. 3 is the component service life estimation screen according to the present illustrative embodiment.

When the second and subsequent display switching buttons 42*b*, 42*c*, . . . are selected on the component service life estimation screen 40, information on the service life of the managed component of the selected type is displayed. For example, when the display switching button 42*g* of "relay" is selected, the screen display is switched to "relay" as shown in FIG. 3. When the screen is displayed for one type of managed component in this way, a plurality of component selection buttons 48*a*, 48*b*, and 48*c* are shown on the left. The buttons are shown as many as the number of managed components of the type provided in the injection molding machine 1 (see FIG. 1). In the case of the relays, the buttons are displayed as many as the number of relays. Component numbers Xa, Xb, and Xc are displayed on the plurality of component selection buttons 48*a*, 48*b*, and 48*c*, respectively. When the component selection button 48*b* is selected, information on the service life of the relay having the component number (component number Xb in FIG. 3) is displayed.

At the bottom of the right field of the screen, managed component location information 50 is shown, and a location where the relay of the component number is provided in the injection molding machine 1 (see FIG. 1) is shown. At the top of the right field of the screen, the estimated service life date and the service life reaching status from the "usage start date" to the estimated service life date shown in a percentage graph are displayed for the relay of the component number. Further, the "Component Price" and the "Estimated Lead Time" stored in association with the relay of the managed component in the managed component purchase related information file 31 are displayed in a component price display field 51 and an estimated lead time display field 52, respectively, as information to be referenced in the determination of the replacement. A reset button 53 is operated when the relay of the component number is replaced. When the reset button 53 is selected, a reset process screen 80 shown in FIG. 6 to be described later is displayed. A component detail information button 54 is a button for displaying a component detail information screen 70 shown in FIG. 5, which will be described later.

{Component Replacement Management Screen}

The component replacement management screen 55 is shown in FIG. 4. The component replacement management screen 55 is displayed when a predetermined operation is performed on the monitor 4*a* of the control device 4 (see FIG. 1), and is for executing the service life estimation process 35. Managed components recommended for replacement, that is, recommended replacement components and replacement history of the managed components are displayed.

The recommended replacement components displayed in a recommended replacement component field in an upper part of the component replacement management screen 55 include a managed component that has reached the advance notice date as predicted by the service life estimation process 35 and a managed component whose failure is detected by the failure detection process 36 (see FIG. 1). In the example of FIG. 4, three recommended replacement components are displayed. That is, a relay of the component number REL-Xb, a ball screw of the component number BLSCR-Xa, and a relay of the component number REL-Xa. The estimated service life date, the component price, and the estimated lead time are displayed for each of the recommended replacement components. The component price and the estimated lead time are "Component Price" and "Estimated Lead Time" stored in the managed component purchase related information file 31.

The user is able to determine whether or not to order the managed components by referring to the component price, and can consider when to order a managed component by referring to the estimated lead time. The component price may be displayed not only in Japanese yen but also in currencies of other countries. Buttons 57, 57, . . . are provided at the head of the recommended replacement components. When the buttons 57, 57, . . . are selected, the component detail information screen 70 (see FIG. 5), which will be described later, is displayed.

Figure 8:
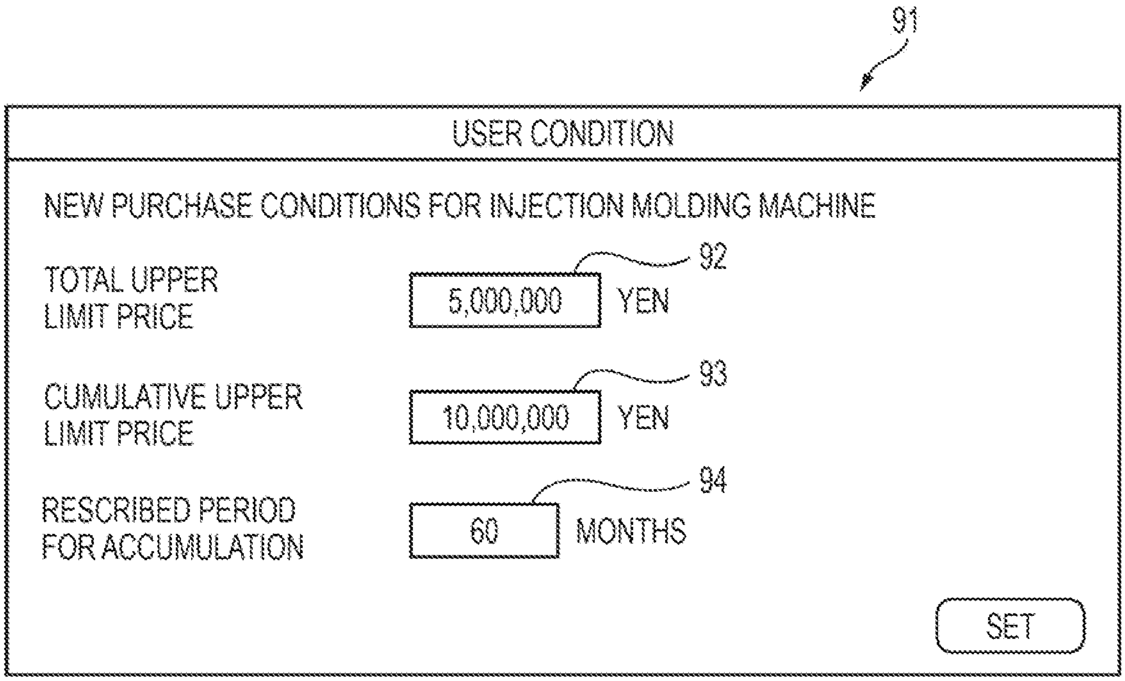
FIG. 8 is a user condition setting screen according to the present illustrative embodiment.

The recommended replacement component field is provided with a recommended replacement components total amount display field 59 for displaying a recommended replacement components total amount, which is a total of the component prices of the recommended replacement components, and an advice display field 60 for displaying advice as to whether to recommend replacement. The injection molding machine 1 (see FIG. 1) according to the present illustrative embodiment allows a user to set a total upper limit price using a total upper limit price setting field 92 on a user condition screen 91 shown in FIG. 8. When the recommended replacement components total amount exceeds the total upper limit price set by the user, advice on notification of the fact and considering purchasing a new injection molding machine is displayed in the advice display field 60. When the recommended replacement components total amount does not exceed the total upper limit price, advice on notification of the fact and recommending replacement of the recommended replacement component is displayed.

History of managed components replaced in the past is displayed in a replacement history field in a lower part of the component replacement management screen 55. In addition to the type and component number of the managed components, the "Replacement Date" and the "Component Price" recorded for each replaced managed component in the managed component replacement history file 33 (see FIG. 1) are displayed. The injection molding machine 1 (see FIG. 1) according to the present illustrative embodiment allows the user to set a prescribed period for accumulation using a prescribed period for accumulation setting field 94 on the user condition screen 91 shown in FIG. 8. The prescribed period for accumulation is displayed in the prescribed period for accumulation display field 62 in the component replacement management screen 55 (see FIG. 4), and the replaced managed components displayed in the replacement history field are only the managed components replaced in a most recent period (60 months in the example shown in FIG. 4). When zero month is set as the prescribed period for accumulation, all replaced managed components are displayed.

A cumulative replaced managed component price display field 64 displays a total amount of component prices of the replaced managed components displayed above. A total amount display field 65 displays an amount obtained by adding the amount displayed in the recommended replacement components total amount display field 59 to the total amount displayed in the cumulative replaced managed component price display field 64. That is, a total amount of a cumulative component price of the managed component replaced in the past and the component price of the managed component to be replaced from now is displayed. The replacement history field of this screen is provided with an injection molding machine main body price display field 67 and an advice display field 68. When the total amount displayed in the total amount display field 65 exceeds the injection molding machine main body price, advice on notification of the fact and considering purchasing a new injection molding machine is displayed in the advice display field 68. When the total amount does not exceed the injection molding machine main body price, an advice on notification of the fact and recommending the replacement of the recommended replacement component is displayed. Incidentally, when the total amount displayed in the total amount display field 65 exceeds a value obtained by multiplying the injection molding machine main body price by a predetermined ratio (for example, 0.6), advice on notification of the fact and considering purchasing a new injection molding machine is displayed. Further, when an amount displayed in the recommended replacement components total amount display field 59 exceeds a value obtained by multiplying the injection molding machine main body price by a predetermined ratio, advice on notification of the fact and considering purchasing a new injection molding machine is displayed.

The total amount displayed in the total amount display field 65 also receives another check. The user can set a cumulative upper limit price using a cumulative upper limit price setting field 93 of the user condition screen 91 shown in FIG. 8. When the total amount displayed in the total amount display field 65 exceeds the cumulative upper limit price, notification of the fact is performed and an advice on considering purchasing a new injection molding machine is displayed in the advice display field 68.

{Component Detail Information Screen}

Figure 5:
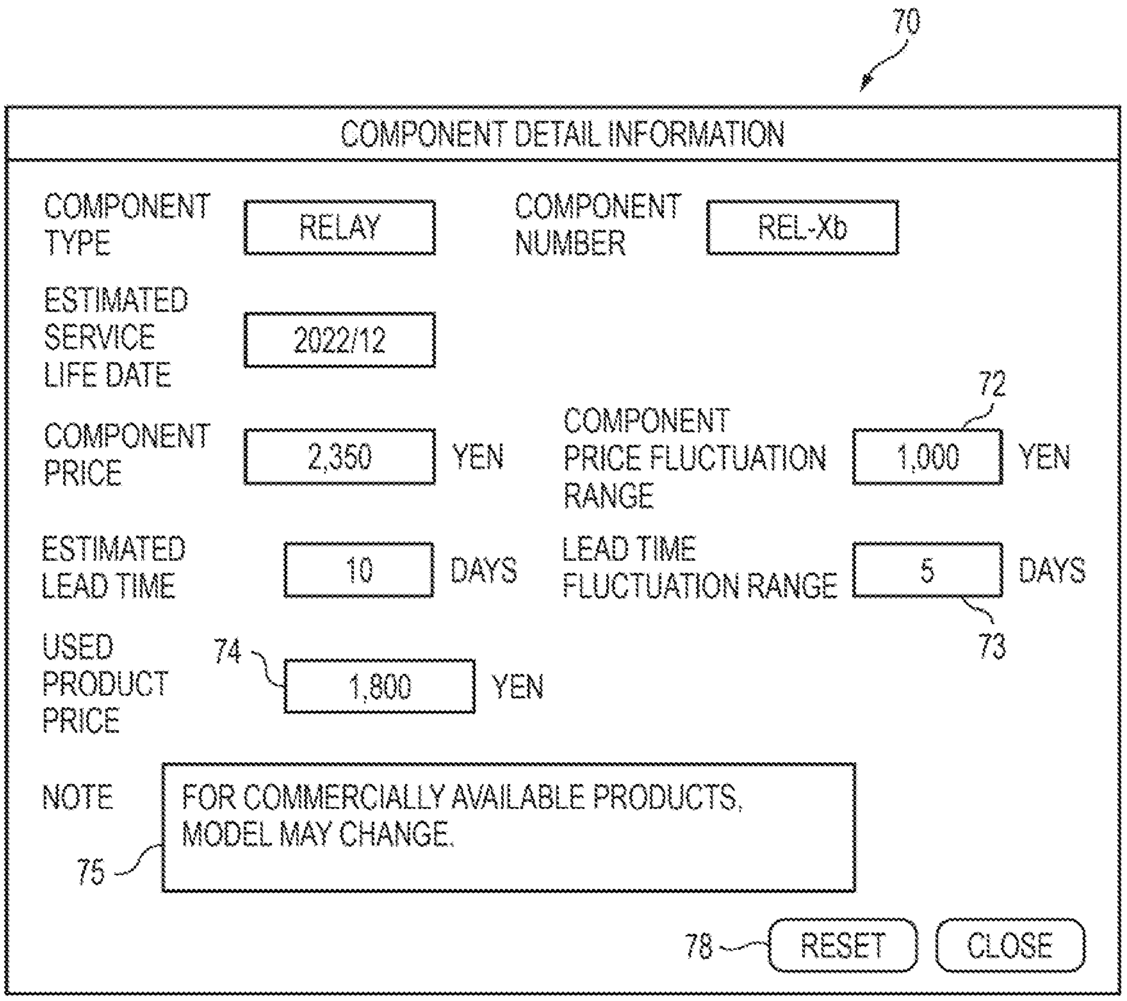
FIG. 5 is a component detail information screen according to the present illustrative embodiment.

When the component detail information button 54 is selected on the component service life estimation screen 40 (see FIG. 3), or when the buttons 57, 57, . . . are selected on the component replacement management screen 55 (see FIG. 4), the component detail information screen 70 shown in FIG. 5 is displayed. The component detail information screen 70 is a screen that displays detailed information about a managed component of a predetermined component number. In addition to the estimated service life date, the component price, and the estimated lead time, information useful for ordering a managed component, that is, component reference information, is also displayed. The component reference information includes a price fluctuation range displayed in a price fluctuation range display field 72, a lead time fluctuation range displayed in a lead time fluctuation range display field 73, and a used product price displayed in a used product price display field 74. Further, a note is displayed in a note display field 75. The component reference information is stored in the "Component Reference Information" of the managed component purchase related information file 31, and display items may be increased or decreased for each managed component.

A reset button 78 is provided on this screen. The reset button 78 is operated when the managed component is replaced. When the reset button 78 is selected, the reset process screen 80 shown in FIG. 6 and to be described below is displayed.

{Reset Process Screen}

Figure 6:
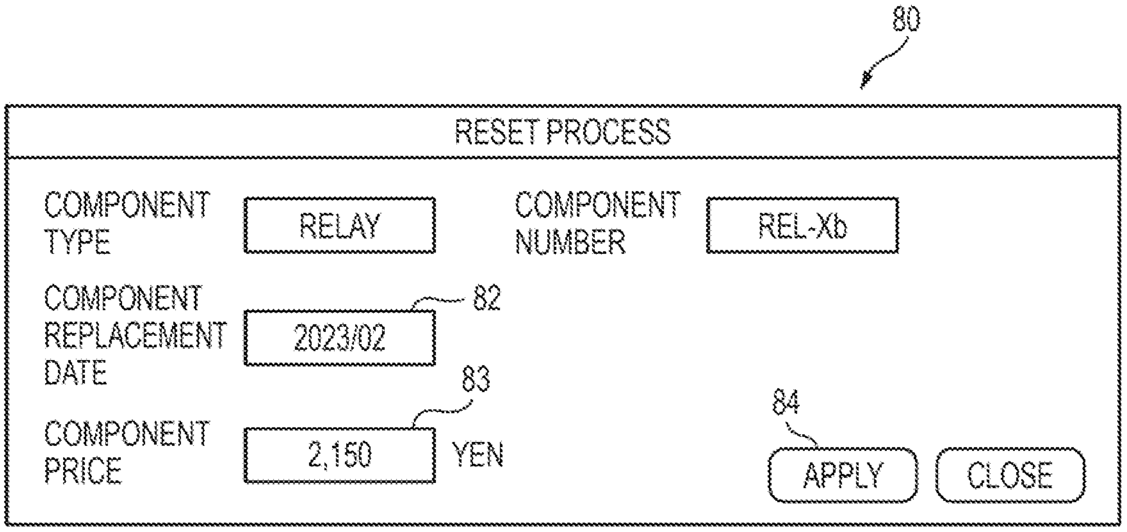
FIG. 6 is a reset process screen according to the present illustrative embodiment.

When the reset button 53 is selected on the component service life estimation screen 40 (see FIG. 3), or when the reset button 78 is selected on the component detail information screen 70 (see FIG. 5), the reset process screen 80 shown in FIG. 6 is displayed. The reset process screen 80 is a screen for resetting the service life when the managed component is replaced. The screen is provided with a component replacement date input field 82 and a component price input field 83. The user inputs a component replacement date and price of a component actually purchased. Next, an apply button 84 is selected. Thus, information on the managed component is added to the managed component replacement history file 33 (see FIG. 1). Then, in the managed component replacement management file 32, the "usage start date" of the managed component is rewritten with the component replacement date. That is, the service life is reset.

{Alarm Screen}

Figure 7A:
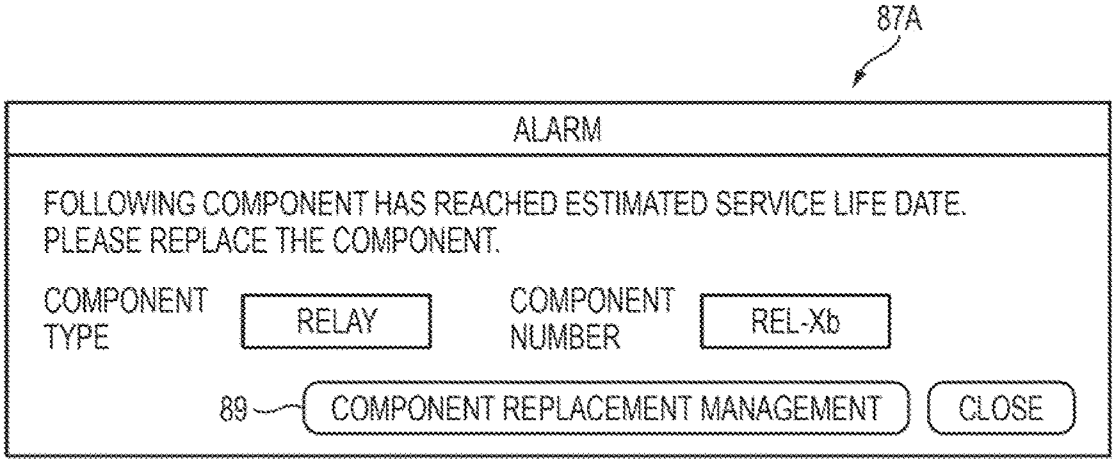
FIG. 7A is an alarm screen according to the present illustrative embodiment.
Figure 7B:
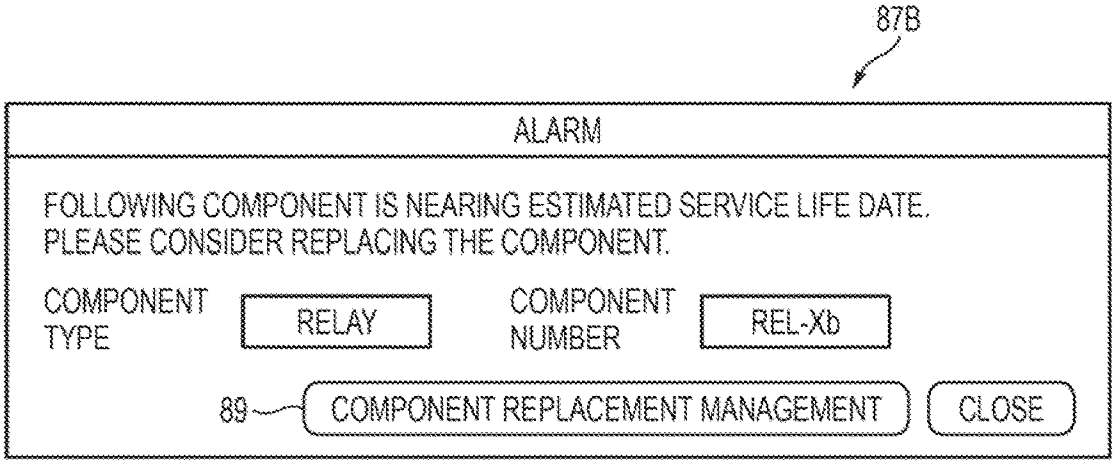
FIG. 7B is an alarm screen according to the present illustrative embodiment.
Figure 7C:
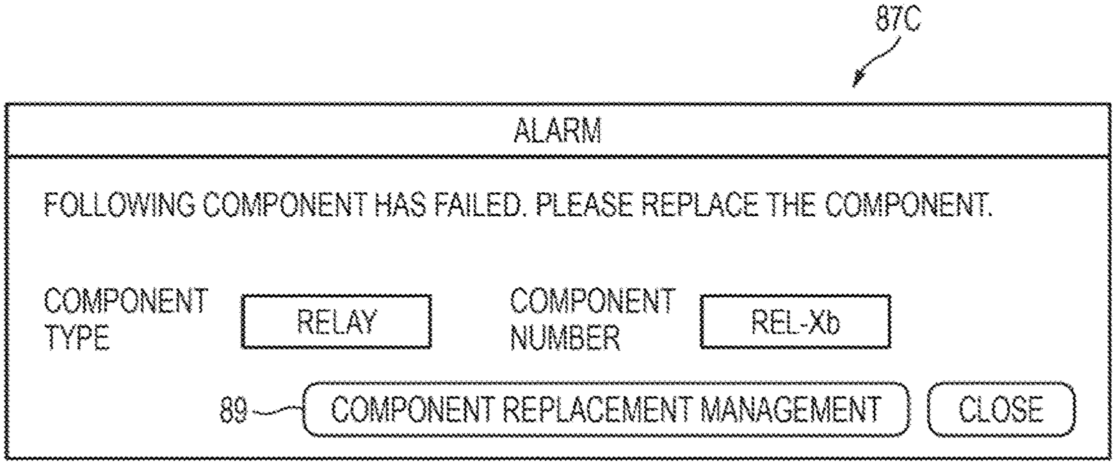
FIG. 7C is an alarm screen according to the present illustrative embodiment.

The alarm screens 87A, 87B, and 87C shown in FIGS. 7A, 7B, and 7C are displayed by the alarm process 37 (see FIG. 1). The alarm screen 87A is displayed when there is a managed component that has reached the estimated service life date. The alarm screen 87B is displayed when the managed component reaches the advance notice date for giving advance notice regarding the service life. The alarm screen 87C is displayed when the failure detection process 36 (see FIG. 1) detects a failure in a managed component and the alarm process 37 is called. The alarm screens 87A, 87B, and 87C are provided with a component replacement management button 89. When the button is selected, the component replacement management screen 55 (see FIG. 4) already described is displayed. Thereafter, the user can consider ordering managed components using the component replacement management screen 55.

Modification to Illustrative Embodiment

Figure 9:
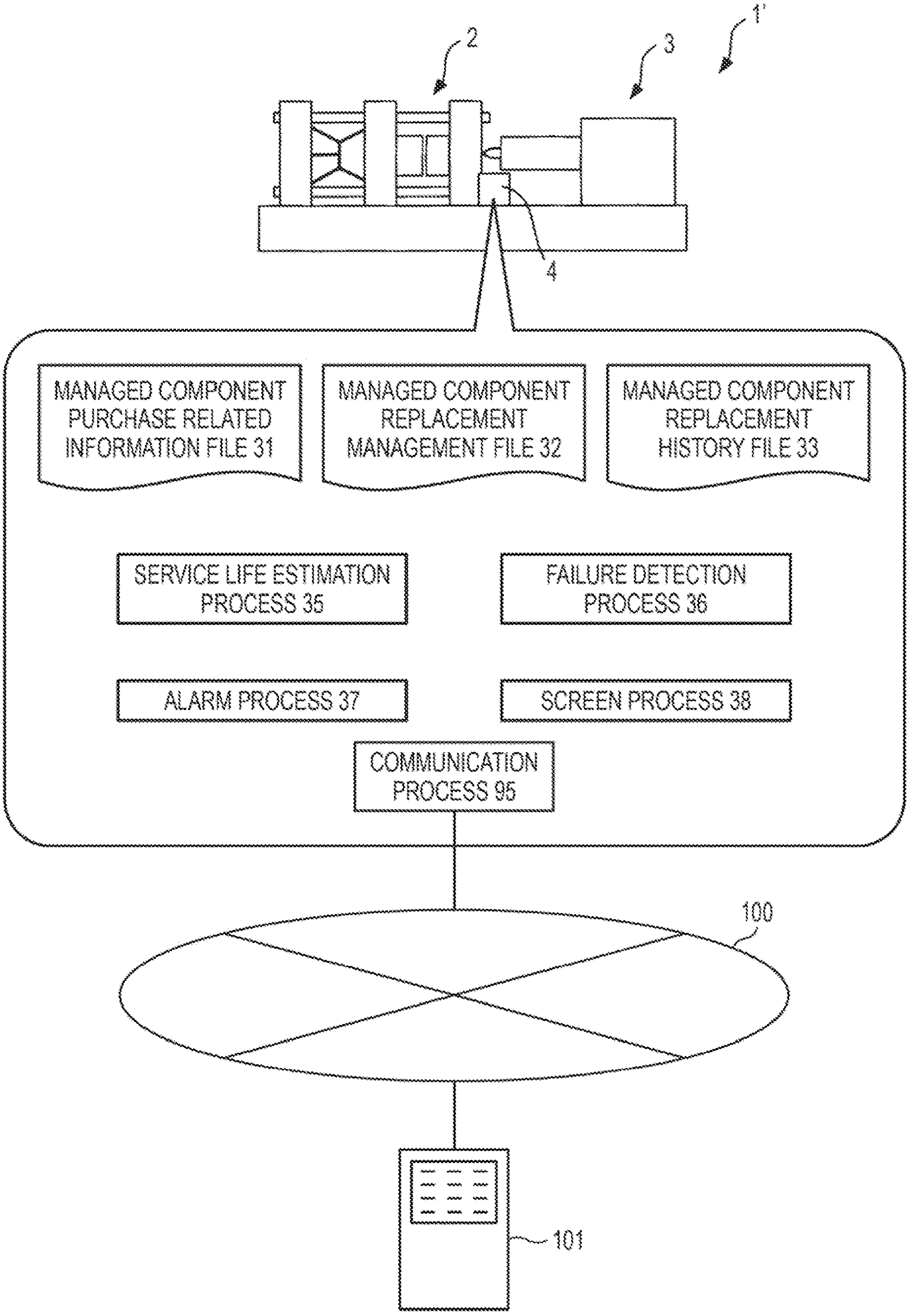
FIG. 9 is a diagram showing an injection molding machine according to a modification of the present illustrative embodiment.

A modification of the present illustrative embodiment will be described. FIG. 9 shows an injection molding machine 1' according to a modification of the present illustrative embodiment. In the injection molding machine 1' according to the modification of the present illustrative embodiment, the mold clamping device 2 and the injection device 3 are configured in the same manner as the injection molding machine 1 according to the present illustrative embodiment shown in FIG. 1. Therefore, the description thereof will be omitted. Most of the file group and the process group for achieving the service life management function provided in the control device 4 in the injection molding machine 1' according to the modification of the present illustrative embodiment are configured in the same manner as the file group and the process group in the injection molding machine 1 according to the present illustrative embodiment. Specifically, there are the managed component purchase related information file 31, the managed component replacement management file 32, the managed component replacement history file 33, the service life estimation process 35, the failure detection process 36, the alarm process 37, and the screen process 38. The description thereof is omitted.

{Communication Process}

In the injection molding machine 1' according to the modification of the present illustrative embodiment, a communication process 95 is provided in the service life management function. The communication process is not performed in the injection molding machine 1 (see FIG. 1) according to the present illustrative embodiment. The communication process 95 is a process of accessing a server 101 via a network 100. The server 101 is managed, for example, by a manufacturer that provides the injection molding machine 1', and stores component reference information such as component price, estimated lead times, and used product price for managed components. The component price is updated every time the component price is revised, and the estimated lead time is updated as necessary depending on a stock status of the managed components or the like. The communication process 95, in which the used product price and the like are updated with the latest information, collects the information and updates the managed component purchase related information file 31 with the information. Accordingly, the service life of the managed component can be managed based on the latest information.

OTHER MODIFICATIONS

The present illustrative embodiment can be modified in other ways. For example, the component price and the like may be displayed not only in Japanese yen but also in currencies of other countries. This can be modified to display the component price in multiple currencies in parallel on the screen. The service life estimation process 35 (see FIG. 1) may also be modified. The method of calculating the estimated service life date based on the "usage start date" and the "usable period", or the method of calculating the cumulative load of a managed component, estimating days until the managed component reaches the end of the service life, and counting forward to obtain the estimated service life date is described in the service life estimation process 35. However, other methods may also be adopted. For example, it is also possible to have engineers periodically inspect the managed components, check a deterioration status each time, and calculate the estimated service life date based on this.

Although the invention made by the present inventors is specifically described based on the illustrative embodiment, it is needless to say that the present invention is not limited to the illustrative embodiments described above, and various modifications can be made without departing from the scope of the invention. A plurality of examples described above may be implemented in combination as appropriate.

What is claimed is:

1. An injection molding machine comprising:

a controller configured to estimate a service life for a plurality of managed components among components of an injection molding machine, with the plurality of managed components being management targets, wherein the controller is configured to manage, for each of the managed components, a usage start date on which usage is started, an estimated service life date which is estimated to be a day on which the service life is reached, and an estimated lead time which is an estimation of a lead time required from order placement to completion of replacement, wherein in a case where one or a plurality of the managed components reaches an advance notice date which is ahead of the estimated service life date by a predetermined number of days, the controller is configured to:

take the managed component as a recommended replacement component; and provide component replacement recommendation information including information to prompt replacement and the estimated lead time for the recommended replacement component, wherein the component replacement recommendation information includes the component price of the recommended replacement component, wherein the controller is further configured to:

manage a component price for each of the managed components and a price condition for evaluating whether a new purchase of the injection molding machine is recommended, and wherein in a case where an amount based on the component price of the recommended replacement component exceeds the price condition, the component replacement recommendation information includes information indicating that a new purchase of the injection molding machine is recommended.

2. The injection molding machine according to claim 1, wherein in a case where the managed component fails, the controller is configured to provide the component replacement recommendation information with taking the failed managed component as the recommended replacement component.

3. The injection molding machine according to claim 1, wherein when there are a plurality of recommended replacement components, the component replacement recommendation information includes a total amount of the component prices of the plurality of recommended replacement components.

4. The injection molding machine according to claim 1, wherein the injection molding machine is connected to a server via a network, and wherein the estimated lead time and the component price related to the managed component are managed on the server.

5. The injection molding machine according to claim 1, wherein the controller is configured to manage a main body price, which is a price of the injection molding machine, and replacement history for each managed component, and wherein in a case where a total amount of a cumulative component price and the component price of the recommended replacement component is higher than the main body price, the cumulative component price being a cumulative total of the component prices of the managed components replaced in a most recent prescribed period, the component replacement recommendation information includes information indicating that a new purchase of the injection molding machine is recommended.

6. The injection molding machine according to claim 1, wherein the controller is configured to manage a main body price, which is a price of the injection molding machine, and a new purchase condition set in advance by a user operation, and wherein in a case where the new purchase condition includes a total upper limit price and where a total amount of the component price of the recommended replacement component is higher than the total upper limit price, the component replacement recommendation information includes information indicating that a new purchase of the injection molding machine is recommended.

7. The injection molding machine according to claim 6, wherein the controller is configured to manage replacement history for each managed component, wherein in a case where the new purchase condition includes a cumulative upper limit price and where a total amount of a cumulative component price and the component price of the recommended replacement component is higher than the cumulative upper limit price, the cumulative component price being a cumulative total of the component prices of the managed components replaced in a most recent prescribed period, the component replacement recommendation information includes information indicating that a new purchase of the injection molding machine is recommended.

8. The injection molding machine according to claim 1, wherein the controller is configured to manage component reference information for each managed component which is a reference for determining an order related to the managed component, and wherein the component replacement recommendation information includes the component reference information.

9. The injection molding machine according to claim 8, wherein the component reference information is a used product price of the managed component.

10. The injection molding machine according to claim 1, further comprising:

a component replacement management screen, wherein the component replacement management screen is configured to:

display a plurality of the managed components; and in a case where the recommended replacement component is present, display the component replacement recommendation information for the recommended replacement component.

11. The injection molding machine according to claim 1, wherein the injection molding machine is configured to, when any one of a plurality of the managed components reaches the advance notice date, output the component replacement recommendation information as an alarm message.

12. A method of providing component replacement recommendation information for an injection molding machine, the method comprising:

managing, for each of a plurality of managed components among components of an injection molding machine as being management targets, a usage start date on which usage is started, an estimated service life date which is estimated to be a day on which a service life is reached, and an estimated lead time which is an estimation of a lead time required from order placement to completion of replacement; and in a case where one or a plurality of the managed components reaches an advance notice date which is ahead of the estimated service life date by a predetermined number of days, taking the managed component as a recommended replacement component, providing component replacement recommendation information including information to prompt replacement and the estimated lead time for the recommended replacement component, wherein the component replacement recommendation information includes the component price of the recommended replacement component, and managing a component price for each of the managed components and a price condition for evaluating whether a new purchase of the injection molding machine is recommended, wherein in a case where an amount based on the component price of the recommended replacement component exceeds the price condition, the component replacement recommendation information includes information indicating that a new purchase of the injection molding machine is recommended.

13. The method of providing component replacement recommendation information for an injection molding machine according to claim 12, wherein in a case where the managed component fails, the method provides the component replacement recommendation information with taking the failed managed component as the recommended replacement component.

14. The method of providing component replacement recommendation information for an injection molding machine according to claim 12, comprising:

managing a component price for each managed component, wherein in the providing of the component replacement recommendation information, the method incorporates the component price of the recommended replacement component into the component replacement recommendation information.

15. The method of providing component replacement recommendation information for an injection molding machine according to claim 14, wherein in the providing of the component replacement recommendation information, when there are a plurality of recommended replacement components, the method incorporates a total amount of the component prices of the plurality of recommended replacement components into the component replacement recommendation information.

16. The method of providing component replacement recommendation information for an injection molding machine according to claim 14, wherein the injection molding machine is connected to a server via a network, and wherein the method manages the estimated lead time and the component price related to the managed component on the server so as to be referenced by the injection molding machine.

17. The method of providing component replacement recommendation information for an injection molding machine according to claim 14, comprising:

managing a main body price, which is a price of the injection molding machine, and replacement history for each managed component are managed, and wherein in the providing of the component replacement recommendation information, in a case where a total amount of a cumulative component price and the component price of the recommended replacement component is higher than the main body price, the cumulative component price being a cumulative total of the component prices of the managed components replaced in the past, the method incorporates information indicating that a new purchase of the injection molding machine is recommended into the component replacement recommendation information.

18. The method of providing component replacement recommendation information for an injection molding machine according to claim 14, comprising:

managing a main body price, which is a price of the injection molding machine, and a new purchase condition set in advance by a user operation, wherein in the providing of the component replacement recommendation information, in a case where the new purchase condition includes a total upper limit price and where a total amount of the component price of the recommended replacement component is higher than the total upper limit price, the method incorporates information indicating that a new purchase of the injection molding machine is recommended into the component replacement recommendation information.

19. The method of providing component replacement recommendation information for an injection molding machine according to claim 18, comprising:

managing replacement history for each managed component, wherein in the providing of the component replacement recommendation information, in a case where the new purchase condition includes a cumulative upper limit price and where a total amount of a cumulative component price and the component price of the recommended replacement component is higher than the cumulative upper limit price, the cumulative component price being a cumulative total of the component prices of the managed components replaced in the past, the method incorporates information indicating that a new purchase of the injection molding machine is recommended into the component replacement recommendation information.

* * * * *